United States Patent [19]
Yonemoto

[11] Patent Number: 5,270,531
[45] Date of Patent: Dec. 14, 1993

[54] SOURCE FOLLOWER CIRCUIT FOR IMAGE SENSOR

[75] Inventor: Kazuya Yonemoto, Tokyo, Japan
[73] Assignee: Sony Corporation, Tokyo, Japan
[21] Appl. No.: 996,146
[22] Filed: Dec. 23, 1992
[30] Foreign Application Priority Data
Dec. 26, 1991 [JP] Japan .................................. 3-345130
[51] Int. Cl.[5] .................................... H01J 40/14
[52] U.S. Cl. .............................. 250/208.1; 358/213.19
[58] Field of Search .................. 250/208.1; 257/443, 257/445; 358/213.19, 213.22, 213.26

[56] References Cited
U.S. PATENT DOCUMENTS 5,023,443  6/1991  Komatsu et al. .................. 250/208.1
5,128,735  7/1992  Ohmi et al. ........................ 250/208.1

Primary Examiner—David C. Nelms
Assistant Examiner—K. Shami
Attorney, Agent, or Firm—Hill, Steadman & Simpson

[57] ABSTRACT

The present invention is directed to a solid state image sensing device which can reduce a consumed amount of an electric power.

During a horizontal blanking period, a vertical scanning pulse of 5 V is supplied to a vertical selection line (2A) from a vertical scanning circuit (3). In synchronism therewith, a voltage ($\phi$I) is changed from 5 V to 0 V and a voltage ($\phi$VGG) is changed from 0 V to 5 V. Thus, a source switch transistor (6) is turned off and a load transistor (9) is turned on, whereby a source follower circuit formed by a pixel transistor (12) and the load transistor (9) of a unit pixel (1) is set in the operable state to read an electrical signal accumulated in the unit pixel (1). According to the present invention, the load transistor (9) is turned on by the application of the voltage ($\phi$VGG) only during the electrical signal read-out period and the dark signal read-out period of the unit pixel within the horizontal blanking period. Since a current is flowed to the pixel transistor (12) by a power supply (7) only during this period, a consumed electric power can be reduced considerably as compared with the prior art.

5 Claims, 4 Drawing Sheets

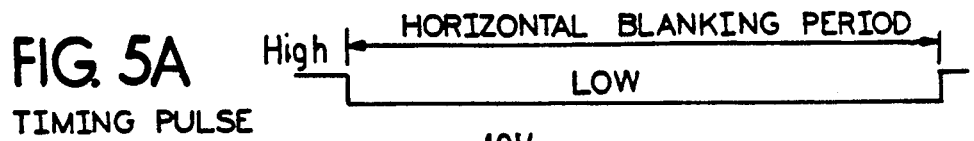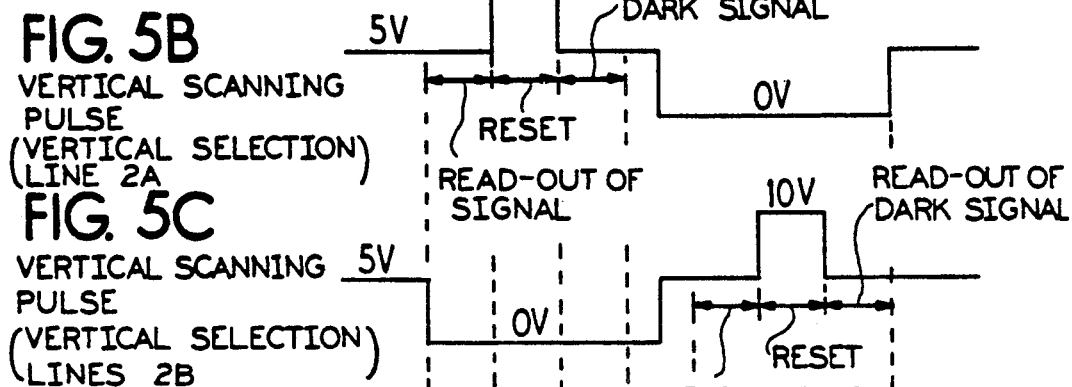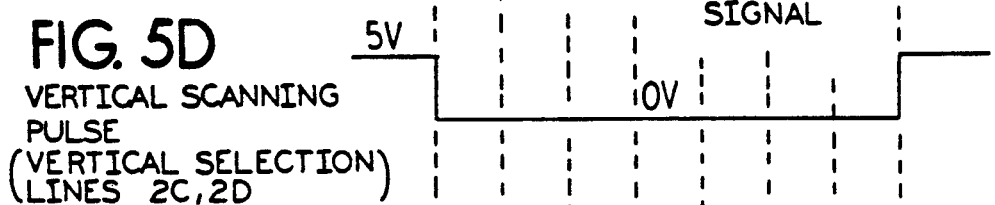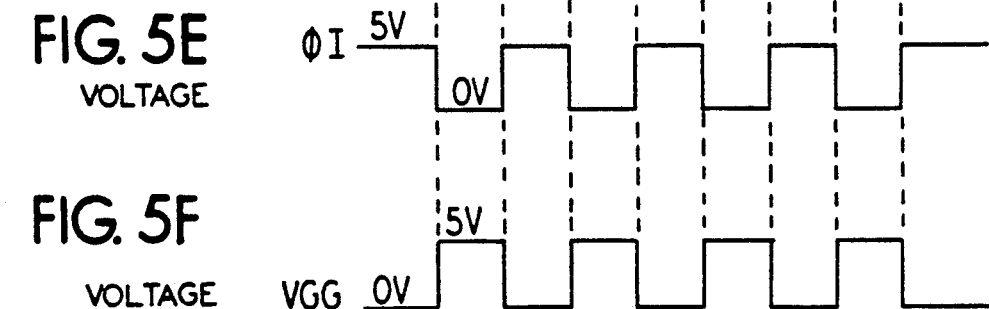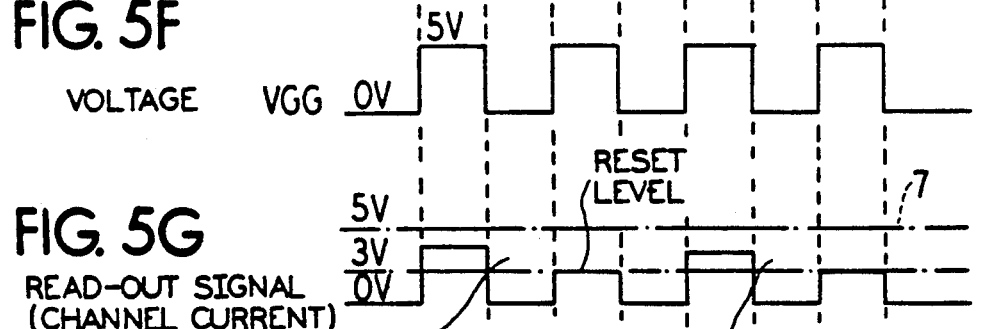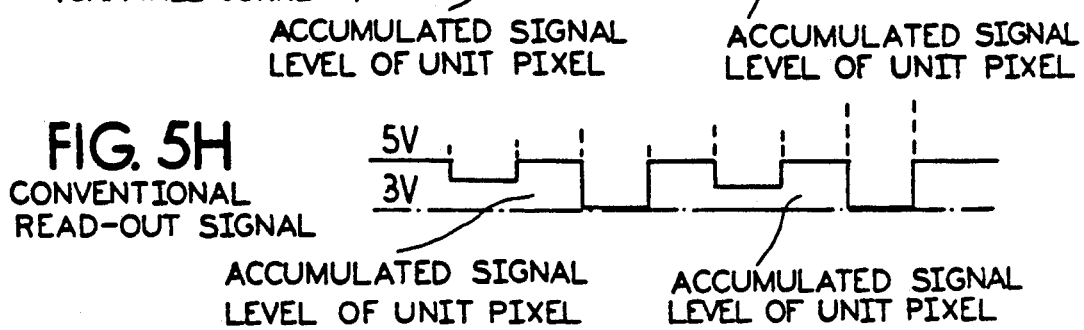

SOURCE FOLLOWER CIRCUIT FOR IMAGE SENSOR

BACKGROUND OF THE INVENTION

1. Field of the Invention

The present invention relates to a solid state image sensing device capable of reducing a power dissipation.

2. Description of the Prior Art

Of solid state image sensing devices, there is known a floating well amplifier (FWA) type solid state image sensing device. In the FWA solid state image sensing device, when holes (positive holes) obtained by photoelectric conversion of a photosensitive element, e.g., photo-diode are accumulated in a P-type well of an N-channel MOS (metal oxide semiconductor) transistor (pixel transistor) and this pixel transistor is turned on, a surface potential of the P-type well is fluctuated by the accumulated holes and a surface channel current is changed. The changed amount of the channel current is read as an output signal of each of the pixels (see FIG. 5).

In this solid state image sensing device, a drain electrode of a load transistor such as an N-channel MOS transistor or the like is connected to the source electrode of the pixel transistor to form a source follower circuit. Thus, when the load transistor is turned on, a channel current is flowed to the P-type well of the pixel transistor in accordance with the source follower circuit.

In the above FWA solid state image sensing device, in order to prevent a blooming from taking place when signal charges accumulated in the P-type well are overflown to adjacent pixels, a gate voltage of the pixel transistor is constantly set to about 5 V and the pixel transistor is set in its on state.

According to the prior art, since the above load transistor is constantly set in its on state, a current is constantly flowed to the source follower circuit formed by the pixel transistor and the load transistor.

Since a current is constantly flowed to the source follower circuit as described above, the conventional FWA solid state image sensing device consumes a large amount of an electric power.

OBJECTS AND SUMMARY OF THE INVENTION

Therefore, it is an object of the present invention to provide an improved solid state image sensing device in which the aforesaid shortcomings and disadvantages of the prior art can be eliminated.

More specifically, it is an object of the present invention to provide a solid state image sensing device which can reduce a consumed electric power.

According to a first aspect of the present invention, there is provided a solid state image sensing device which comprises a plurality of pixels, each being formed of a photosensitive element and a pixel transistor, being arrayed in horizontal and vertical directions in a two-dimensional fashion, a gate electrode and a source electrode of the each pixel transistor being connected to a vertical selection line and a vertical signal output line, respectively, and a load transistor, a drain electrode of the load transistor being connected to the source electrode of the pixel transistor to thereby form a source follower circuit, wherein the load transistor is turned on only during a pixel signal read-out period within a horizontal blanking period.

In accordance with a second aspect of the present invention, there is provided a solid state image sensing device which comprises a plurality of pixels, each being formed of a photosensitive element and a pixel transistor, being arrayed in horizontal and vertical directions in a two-dimensional fashion, a gate electrode and a source electrode of the each pixel transistor being connected to a vertical selection line and a vertical signal output line, respectively, and a load transistor, a drain electrode of the load transistor being connected to the source electrode of the pixel transistor to thereby form a source follower circuit, wherein the load transistor is turned on only during a horizontal blanking period.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 5A through 5H are diagrams used to explain timings of control signals and output signals, respectively.

DETAILED DESCRIPTION OF THE PREFERRED EMBODIMENTS

The present invention will hereinafter be described with reference to the drawings.

Figure 1:
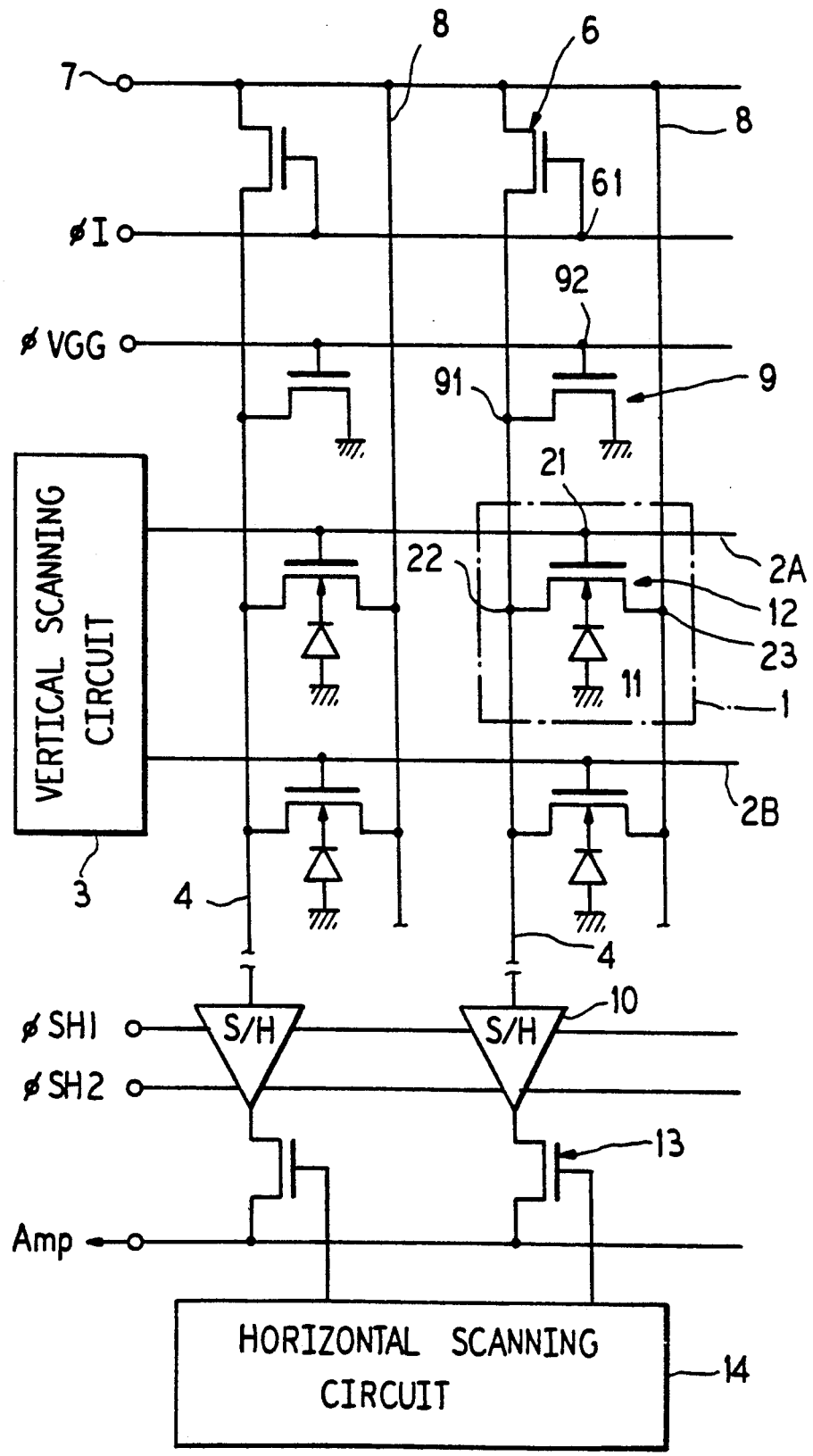
FIG. 1 is a diagram showing a structure of a solid state image sensing device according to an embodiment of the present invention.

FIG. 1 of the accompanying drawings shows a structure of a solid state image sensing device according to an embodiment of the present invention. The solid state image sensing device according to the present invention will hereinafter be described with reference to also FIG. 2 of the accompanying drawings which shows an equivalent circuit of the solid state image sensing device shown in FIG. 1. As shown in FIG. 1, a plurality of unit pixels 1 are arrayed in the horizontal and vertical directions in a two-dimensional fashion. Each of the unit pixels 1 comprises a photosensitive element 11 such as a photo-diode or the like and a pixel transistor 12 such as an MOS transistor or the like.

The photosensitive element 11 is connected to a channel region of the pixel transistor 12 as will be described later on. An electrical signal generated when the photosensitive element 11 is energized is accumulated in a P-type well 33 (see FIG. 3) of the pixel transistor 12.

A gate electrode 21 of the pixel transistor 12 is connected to vertical selection lines 2A, 2B, . . . (only two selection lines 2A, 2B are shown in FIG. 1). The vertical selection lines 2A, 2B, . . . are connected to a vertical scanning circuit 3. The vertical selection lines 2A, 2B, . . . are sequentially scanned by vertical scanning pulses supplied thereto from the vertical scanning circuit 3.

A source electrode 22 of the pixel transistor 12 is connected to a vertical signal output line 4. The other side (upper end side in FIG. 1) of the vertical signal output line 4 is connected through a source switch transistor 6 to a power supply 7. A voltage $\phi I$ is applied to a gate electrode 61 of the source switch transistor 6 at a predetermined timing, thereby the source switch transistor 6 being turned on. A drain electrode 23 of the pixel transistor 12 also is connected to the power supply 7 by way of a power supply line 8.

Figure 2:
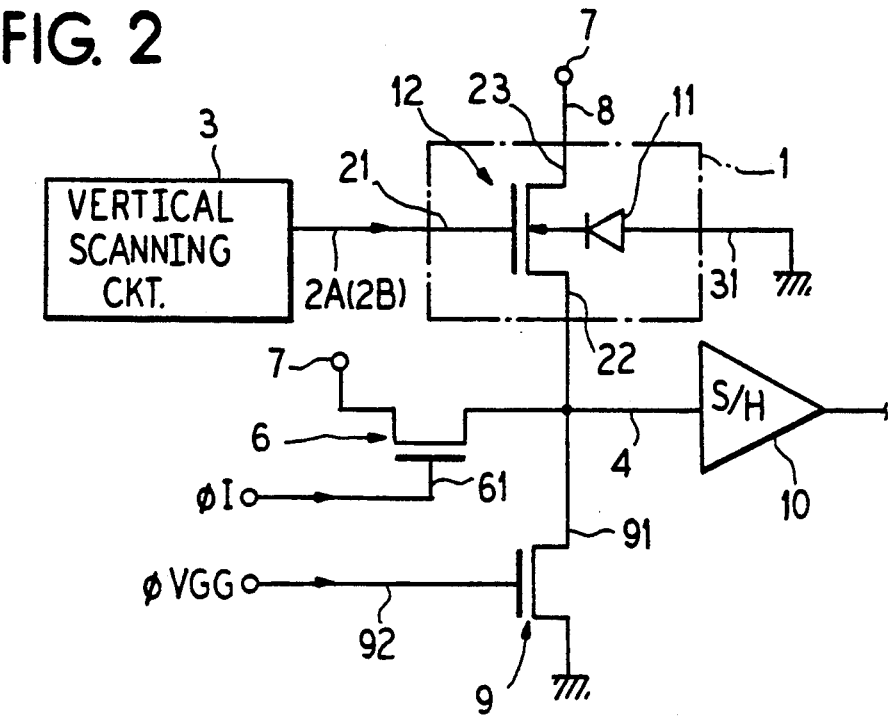
FIG. 2 is a circuit diagram showing an equivalent circuit of the solid state image sensing device according to the present invention.

To the source switch transistor 6 side on the vertical signal output line 4, there is connected a load transistor 9, i.e., a drain electrode 91 of an MOS transistor in this embodiment. As shown in FIG. 2, the load transistor 9 and the pixel transistor 12 constitute a source follower circuit.

The other side (under side in FIG. 1) of the vertical signal output line 4 is connected to a sample and hold (S/H) circuit 10. Electrical signals of all unit pixels 1 connected to one vertical selection line 2A (2B, 2C, ...) are held in the sample and hold circuit 10. MOS switches 13 connected to the sample and hold circuits 10 are sequentially turned on by horizontal scanning pulses transmitted from a horizontal scanning circuit 14, whereby the electrical signals held in the sample and hold circuits 10 are sequentially output.

When the above electrical signal output operation is sequentially effected on all the vertical selection lines 2A, 2B, ..., an image signal of this solid state image sensing device can be obtained. The electrical signal generated in the unit pixel 1 is read once per upper and lower two vertical selection lines 2A, 2B during the horizontal blanking period. These electrical signals are synthesized by the sample and hold circuit 10, thereby produced as an electrical signal of one line.

Figure 3:
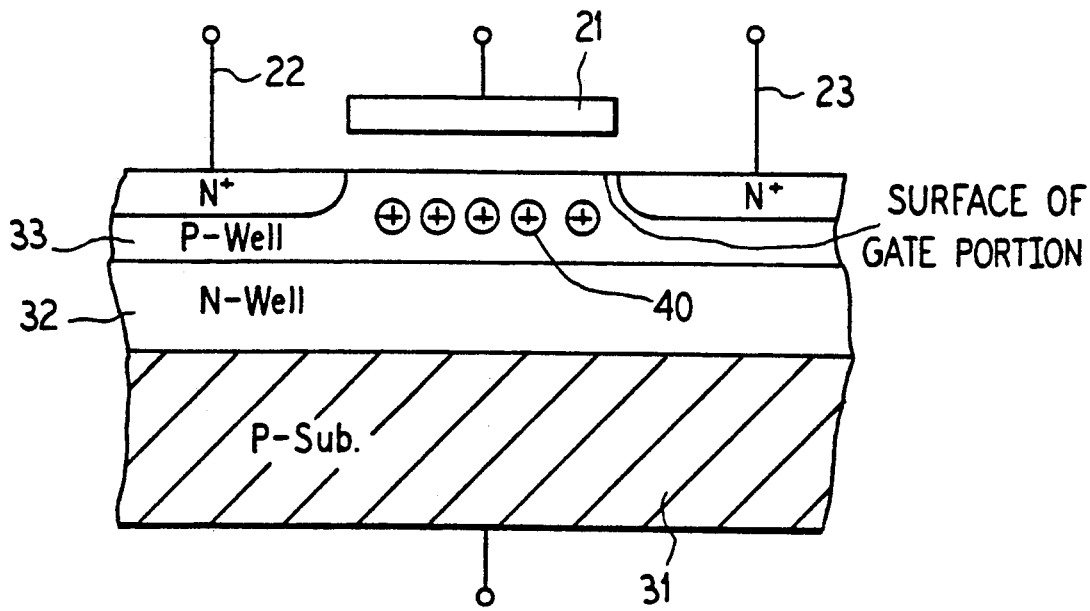
FIG. 3 is a cross-sectional diagram showing a structure of a unit pixel used in the present invention.

FIG. 3 of the accompanying drawings shows a cross section of the unit pixel 1. As shown in FIG. 3, a P-type silicon substrate 31 has formed on its surface an N-type well 32 on which the P-type well 33 is formed. On the surface of the P-type well 33, there is formed a gate electrode 21 through an insulating member (not shown). The gate electrode 21 is connected to the vertical selection lines 2 (FIG. 1) as described above.

An N+ source region and an N+ drain region are formed as a proper spacing at both sides of the gate electrode 21 over the P-type well 33. A source electrode 22 and a drain electrode 23 are respectively connected to the N+ source and N+ drain regions. The source electrode 22 is connected to the vertical signal output line 4 and the drain electrode 23 is connected to the power supply line 8.

Figure 4A:
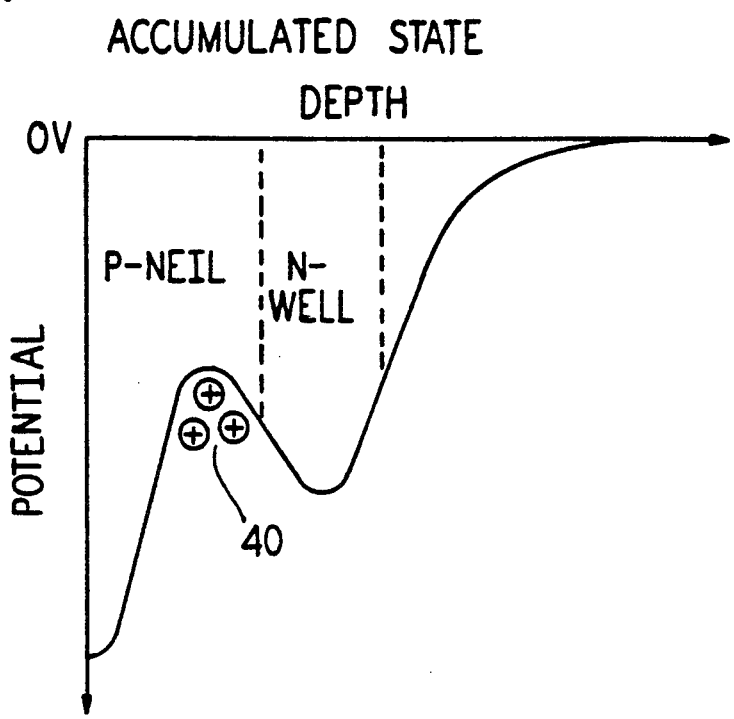
FIGS. 4A and 4B are respectively diagrams used to explain a potential distribution of a gate section in the unit pixel.

Holes (positive holes) 40 generated by the photo-electric conversion are accumulated in the P-type well 33 and an accumulated state shown in FIG. 4A is presented. When the vertical scanning pulse is transmitted from the vertical scanning circuit 3 under this accumulated state, the pixel transistor 12 is turned on.

Figure 4B:
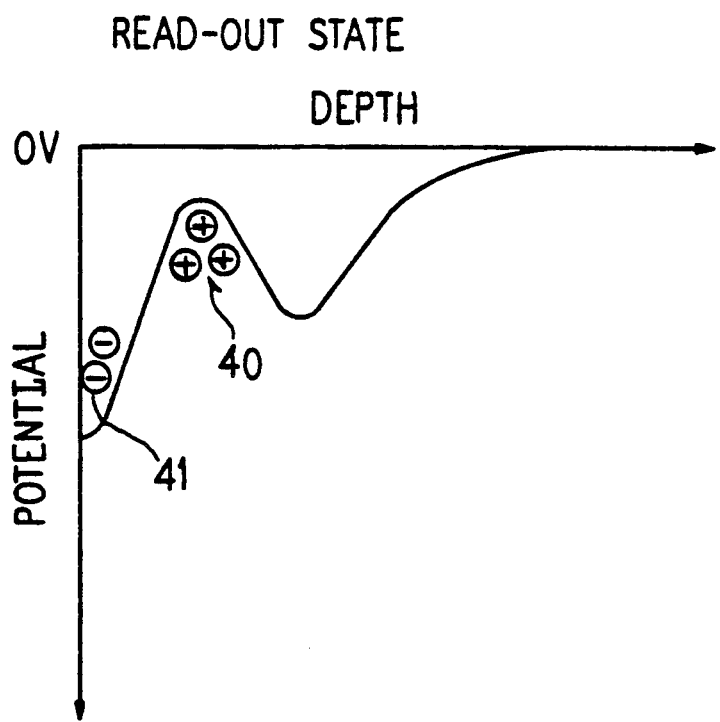

At that time, as shown in FIG. 4B, a channel current 41 flowed to the pixel transistor 12 is fluctuated by the holes 40, thereby changing a source potential of the source follower circuit formed by the unit pixel 1 and the load transistor 9. A changed amount of the source potential at that time becomes an output signal of the unit pixel 1.

FIGS. 5A through 5H are respectively diagrams showing operation timings of the above control signals and the output signal of the unit pixel 1. According to this embodiment, during a horizontal effective scanning period (horizontal scanning period—horizontal blanking period), the voltage $\phi I$ applied to the gate electrode 61 of the source switch 6 is set to 5 V and a voltage $\phi VGG$ applied to the gate electrode 92 of the load transistor 9 is set to 0 V.

As will be described next, the voltage $\phi I$ and the voltage $\phi VGG$ are changed at a predetermined timing during the horizontal blanking period, whereby the operation state of the source switch 6 or the load transistor 9 is changed to read an electrical signal.

During the horizontal blanking period, of the upper and lower two vertical selection lines, for example, 2A and 2B, a vertical selection pulse of 5 V (Volts)is applied to the upper vertical selection line 2A from the vertical scanning circuit 3. In synchronism therewith, the voltage $\phi I$ which is applied to the gate electrode 61 of the source switch 6 (FIG. 2) is changed from 5 V to 0 V and the voltage $\phi VGG$ which is applied to the drain electrode 91 of the load transistor 9 is changed from 0 V to 5 V.

Therefore, the source switch 6 is turned off and the load transistor 9 is turned on so that the electrical signal of the pixel unit 1 applied to the vertical selection line 2A is read out and stored in the sample and hold circuit 10.

In synchronism with the application of 10 V to the vertical selection line 2A, the voltage $\phi I$ is changed to 5 V and the voltage $\phi VGG$ is changed to 0 V. By this reset operation, the holes 40 accumulated in the P well 33 in the unit pixel 1 are discharged to the P-type silicon substrate 31 side. When a light whose intensity is higher than a certain value becomes incident, the holes 40 exceeds the accumulation capacity of the P well 33 and are then overflown through the N well 32 to the P-type silicon substrate 31, thereby restraining a blooming.

Subsequently, the voltage 5 V is applied to the vertical selection line 2A. In synchronism therewith the voltage $\phi I$ is changed to 0 V and the voltage $\phi VGG$ is changed to 5 V. Thus, a dark signal accumulated in the unit pixel 1 is read out. By subtracting this dark signal from the electrical signal read out before, it is possible to obtain an accurate signal component.

After the read-out of the upper vertical selection line 2A is ended, the read-out of the lower vertical selection line 2B is effected and both electrical signals are synthesized as described above. While one vertical selection line 2A (2B) is operated, the voltage of 0 V is applied to the other vertical selection line 2B (2A). Further, while either of the two vertical selection lines 2A, 2B is operated, the voltage of 0 V is applied other vertical selection lines 2C, 2D, ...

The above read-out operation is sequentially effected on all the vertical selection lines 2A, 2B, ..., thereby producing the image signal of all the pixels.

In this solid state image sensing device, only when the electrical signal and the dark signal accumulated in the unit pixel 1 are read out, the voltage $\phi VGG$ applied to the load transistor 9 becomes 5 V and held at 0 V in other cases. Since the read-out period of the electrical signal and the dark signal is extremely short, the channel current is flowed to the load transistor 9 in an extremely short period of time. Therefore, the consumed amount of the electric power can be considerably reduced as compared with the case that the load transistor 9 is turned on even during the horizontal effective scanning period (see FIG. 5H).

While the load transistor 9 is turned on only during the read-out period according to the above embodiment of the present invention, in accordance with a second embodiment of the present invention, the voltage φVGG is set to 5 V over the whole horizontal blanking period. During other periods, the voltage φVGG is set to 0 V, thereby controlling the load transistor 9.

According to the second embodiment of the present invention, even when the driving speed of the voltage φVGG is slow, a ringing at a leading edge or trailing edge of the waveform of the voltage φVGG is not produced during the read-out period of the electrical signal accumulated in the unit pixel 1. Therefore, a stable output can be obtained.

In that case, even during the reset period, the load transistor 9 is turned on, consuming an electric power uselessly. However, this reset period is very short period of time as compared with the horizontal scanning period so that the electric power consumed during this reset period is very small. Hence, there occurs no problem.

As described above, according to the first embodiment of the present invention, the load transistor that forms the source follower circuit together with the pixel transistor in the unit pixel is turned on in synchronism with the read-out timing of the electrical signal in the unit pixel.

Therefore, according to the first embodiment of the present invention, since the operation time of the load transistor is considerably short, the electric power amount generated by the channel current flowing to the load transistor can be reduced considerably.

Further, according to the second embodiment of the present invention, the load transistor is turned on substantially over the entire period of the horizontal blanking period and is turned off during other periods.

Therefore, according to the second embodiment of the present invention, even when the driving speed of the power supply that turns the load transistor on is low, the ringing at the leading edge or trailing edge of the voltage waveform can be prevented from being produced during the read-out period of the electrical signal accumulated in the unit pixel, thereby making it possible to obtain the stable output signal.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A solid state image sensing device comprising:

(a) a plurality of pixels, each being formed of a photosensitive element and a pixel transistor, being arrayed in horizontal and vertical directions in a two-dimensional fashion, a gate electrode and a source electrode of said each pixel transistor being connected to a vertical selection line and a vertical signal output line, respectively, and;

(b) a load transistor, a drain electrode of said load transistor being connected to said source electrode of said pixel transistor to thereby form a source follower circuit, wherein said load transistor is turned on only during a pixel signal read-out period within a horizontal blanking period.

2. A solid state image sensing device comprising:

(a) a plurality of pixels, each being formed of a photosensitive element and a pixel transistor, being arrayed in horizontal and vertical directions in a two-dimensional fashion, a gate electrode and a source electrode of said each pixel transistor being connected to a vertical selection line and a vertical signal output line, respectively, and;

(b) a load transistor, a drain electrode of said load transistor being connected to said source electrode of said pixel transistor to thereby form a source follower circuit, wherein said load transistor is turned on only during a horizontal blanking period.

3. The solid state image sensing device according to claim 2, wherein said load transistor is turned on only during said pixel signal read-out period and a dark signal read-out period within said horizontal blanking period.

4. The solid state image sensing device according to claim 1, further comprising a power supply and a source switch transistor whose main current path is connected in series between said power supply and said vertical signal output line and said source switch transistor is turned off when said load transistor is turned on.

5. Ths solid state image sensing device according to claim 1, wherein said pixel transistor comprises a first well of a second conductivity type (N-type) formed on a semiconductor substrate of a first conductivity type (P-type), a second well of the first conductivity type (P-type) formed on said first well, source and drain regions formed within said second well, a channel region formed between said source and drain regions, a source electrode connected to said source region, a drain electrode connected to said drain region, and a gate electrode formed through an insulating layer on said channel region and the drain electrode of said load transistor is connected to said source electrode of said pixel transistor.

* * * * *